US008843158B2

United States Patent
Nagaraj (10) Patent No.: US 8,843,158 B2
(45) Date of Patent: Sep. 23, 2014

(54) DELIVERING CONTENT BY PREDICTING PREDETERMINED ROUTES USING WIRELESS NETWORKS

(75) Inventor: Suresh Nagaraj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 13/402,794

(22) Filed: Feb. 22, 2012

(65) Prior Publication Data

US 2013/0217414 A1     Aug. 22, 2013

(51) Int. Cl.
H04W 24/00     (2009.01)

(52) U.S. Cl.
USPC .......... 455/456.2; 455/404.2; 455/456.1; 455/456.3; 455/550.1; 455/436; 370/328; 370/331; 370/332

(58) Field of Classification Search
CPC .................................................... H04W 24/00
USPC ............... 455/404.2, 414.1, 418–420, 422.1, 455/456.1–457, 550.1, 556.2, 435.1–453; 370/328, 338, 331, 332
See application file for complete search history.

(56) References Cited

U.S. PATENT DOCUMENTS

| | | | |
|---|---|---|---|
| 6,664,924 B2 | 12/2003 | Knockeart et al. | |
| RE43,010 E | 12/2011 | Hoshino et al. | |
| 2002/0077122 A1* | 6/2002 | Yule | 455/456 |
| 2003/0235165 A1* | 12/2003 | Wang | 370/331 |
| 2004/0259545 A1* | 12/2004 | Morita | 455/435.1 |
| 2007/0197231 A1* | 8/2007 | Lin | 455/456.1 |
| 2010/0153004 A1 | 6/2010 | Natsume | |
| 2011/0092237 A1 | 4/2011 | Kato et al. | |

* cited by examiner

Primary Examiner — Babar Sarwar
(74) Attorney, Agent, or Firm — Fish & Richardson P.C.

(57) ABSTRACT

The disclosed implementations provide a system and method of predicting routes for mobile devices using wireless networks, including generating and sending content to a mobile device that is travelling on a predetermined route (e.g., a bus route determined by a transportation agency). The mobile device can scan for a wireless network that is installed on a vehicle travelling on a predetermined route. The system can predict which predetermined route the mobile device is travelling on by accessing a database that associates wireless networks with transportation vehicles. The system can confirm whether the mobile device is travelling on a predetermined route based on the device's sensor measurements, timestamps collected over a period of time and the identity of the wireless network that is connected to the device. The system can send content to the mobile device based on the mobile device's location and predicted future locations along the predetermined route.

63 Claims, 8 Drawing Sheets

DELIVERING CONTENT BY PREDICTING PREDETERMINED ROUTES USING WIRELESS NETWORKS

TECHNICAL FIELD

This disclosure is related generally to delivering content to a device.

BACKGROUND

Transportation agencies can manage vehicles that travel predetermined routes at predetermined times to pick up and drop off riders (e.g., buses). Transportation agencies often post their schedules online or in newspapers so that riders will know when and where vehicles will be. If the schedules are posted online on a server, a device (e.g., a smart phone) can send a request to the server, and the server can respond with a schedule of times that are displayed on the device.

SUMMARY

The disclosed implementations provide a system and method of predicting routes for mobile devices using wireless networks, including generating and sending content to a mobile device that is travelling on a predetermined route (e.g., a bus route determined by a transportation agency). The mobile device can scan for a wireless network (e.g., Wi-Fi access point) that is installed on a vehicle travelling on a predetermined route. The system can predict which predetermined route the mobile device is travelling on by accessing a database that associates wireless networks with transportation vehicles. The system can confirm whether the mobile device is travelling on a predetermined route based on the device's sensor measurements, timestamps collected over a period of time and the identity of the wireless network that is connected to the device. The system can send content to the mobile device based on the mobile device's location and predicted future locations along the predetermined route. For example, content can be information about when the vehicle will arrive at a next stop on the predetermined route.

In general, one innovative aspect of the subject matter described in this specification can be embodied in methods that include the actions of receiving a request from a wireless network installed in a moving object, the wireless network being coupled to a mobile device in the moving object; retrieving a predetermined route associated with the wireless network from a database; generating content based at least on the predetermined route; and sending the content to the mobile device. Other embodiments of this aspect include corresponding systems, apparatus, and computer programs, configured to perform the actions of the methods, encoded on computer storage devices.

These and other embodiments can each optionally include one or more of the following features. The moving object is a bus, train, or plane. The predetermined route is an established path to be travelled by the moving object. The content includes information about a future destination along the predetermined route. The request includes data associated with one or more sensors onboard the device. The sensor data includes at least one of accelerometer data and location coordinates. Confirming that the mobile device is moving along the predetermined route based on the sensor data. Determining that the mobile device is moving along the predetermined route comprises: calculating a first location and a first direction of the moving object based at least on one of the predetermined route and a time received from the mobile device; determining a second location and a second direction of the mobile device based on at least one of the sensor data and the time received from the mobile device; and establishing the mobile device is moving along a same path as the moving object based on at least one of the locations or the directions. The database includes an entry identifying a wireless network, a service provider, a route, and a vehicle entity. The database is an internal database or a third party database.

Particular implementations of generating and sending content to a mobile device that is travelling on a predetermined route can provide several advantages, including allowing users to receive relevant information based on their mobile devices' location and predicted routes. For example, a user on a vehicle that is travelling on a predetermined route (e.g., a bus travelling on its bus route) can receive information about the vehicle's next destination or advertisements related to the vehicle's future destination. Another advantage is that the system can consider predetermined routes from multiple sources such as an internal database or third party database to increase the likelihood of predicting a correct predetermined route.

DESCRIPTION OF DRAWINGS

The same reference symbol used in various drawings indicates like elements.

DETAILED DESCRIPTION

The disclosure that follows describes a network-enabled system application that provides predicting routes using a wireless network (e.g., a Wi-Fi hotspot). The network-enabled system application can be running on one or more server computers and be communicating with one or more remotely located mobile devices using the World Wide Web ("the Web").

Figure 1:
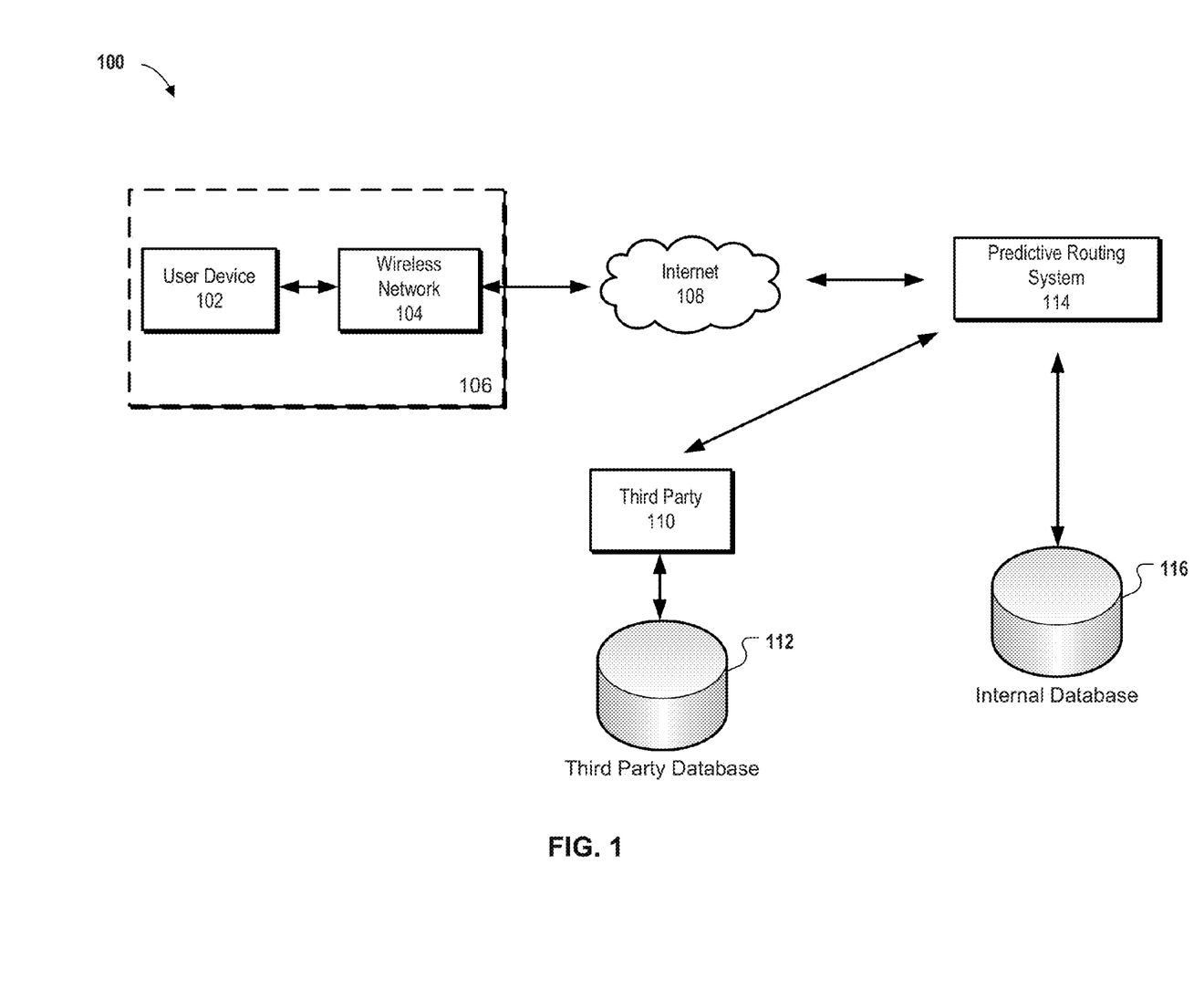
FIG. 1 is a block diagram of an exemplary system that provides predictive routing for a mobile device.

FIG. 1 is a block diagram of an exemplary system 100 that provides predictive routing for a mobile device. A mobile device 102 communicates with a wireless network 104. The mobile device 102 can be a mobile device such as an electronic tablet, laptop, or smart phone. The wireless network 104 can be a Wi-Fi hot spot that includes a wireless access point for wireless connection to the mobile device 102. The wireless network 104 can also include a cellular (e.g., 3G or 4G) or other wireless connection to a wide area network 108 (e.g., the Internet). Many mobile devices can be connected to the wireless network 104. The mobile device 102 and the wireless network 104 can be located on a vehicle 106 that travels on a predetermined route. In some implementations, the wireless network 104 is installed on the vehicle 106.

The wireless network 104 can connect to a predictive routing system 114 through the wide area network 108. The predictive routing system 114 can include one or more servers. These servers can be in different physical locations and have different capabilities and architectures. The predictive routing system 114 can communicate with an internal database 116. The internal database 116 can include information about wireless networks that are associated with transportation vehicles that have the wireless networks installed. For example, the internal database 116 can include an entry of the wireless network 104 being associated with the vehicle 106. The predictive routing system 114 can also communicate with a third party 110. The third party 110 can maintain its own database 112 of wireless networks that are associated with vehicles. For example, the third party can be a transportation agency that installs and maintains the wireless networks on the agency's vehicles. The transportation agency can maintain a database that associates its vehicles with the wireless networks (e.g., routers) installed on the vehicles. The predictive routing system 114 can process data from a third party's database or the internal database 116 to provide route prediction.

Figure 2:
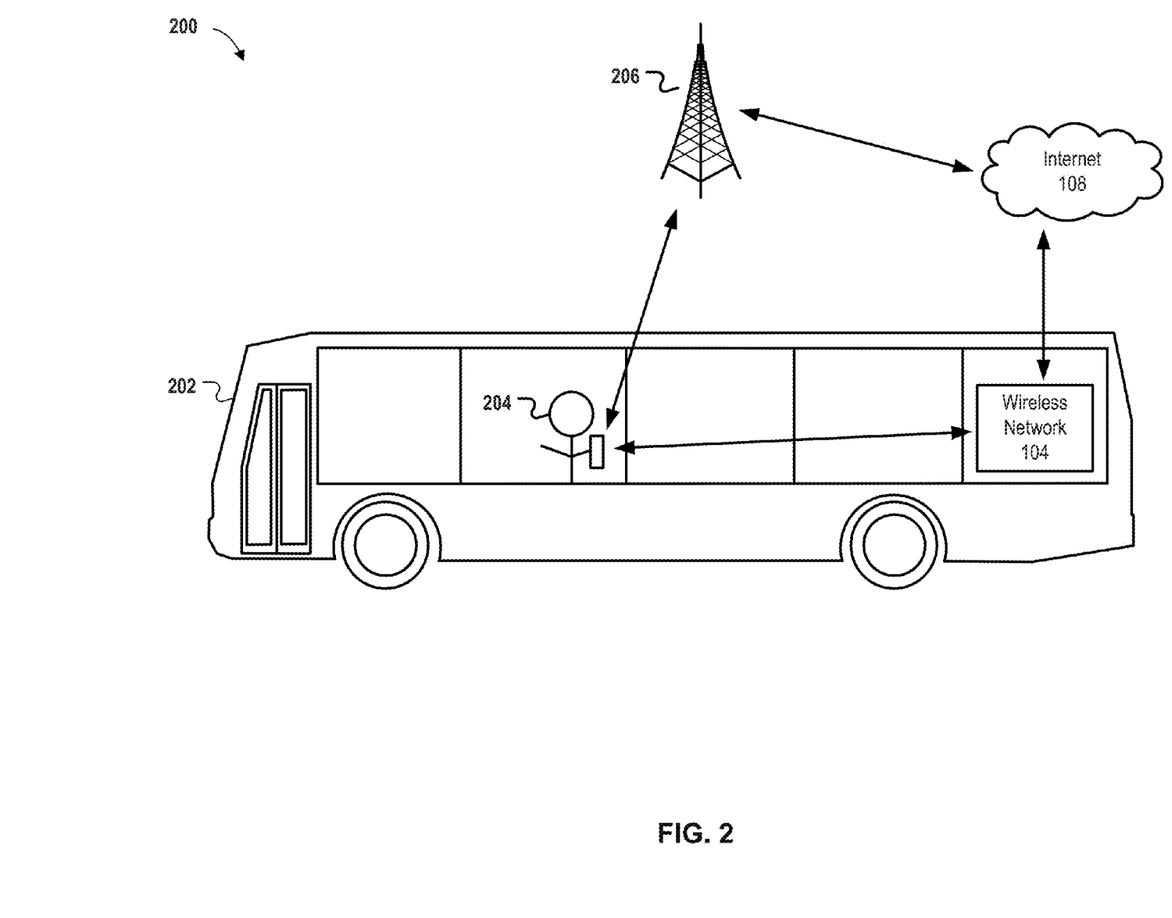
FIG. 2 is a diagram of an exemplary vehicle equipped with a wireless network that provides predictive routing for the mobile device.

FIG. 2 is a diagram of an exemplary vehicle equipped with a wireless network that provides predictive routing 200. In this example, a bus 202 can carry a user 204 having a mobile device. In some implementations, the mobile device scans for the wireless network 104 aboard the vehicle. The mobile device can connect to the wide area network 108 through a cellular data connection (e.g., through a cellular tower 206) and send the scanned wireless network to the predictive routing system 114. In some alternative implementations, when in range, the mobile device connects to the wireless network 104 onboard the vehicle. The wireless network 104 can connect to the wide area network 108, which can communicate with the predictive routing system 114. Either the mobile device or the predictive routing system 114 can determine whether the mobile device is on the bus 202. The predictive routing system 114 then can send content based on the determination (e.g., a bus route, bus schedule, or local advertisement) through the wireless network 104 or a cellular connection.

Figure 3:
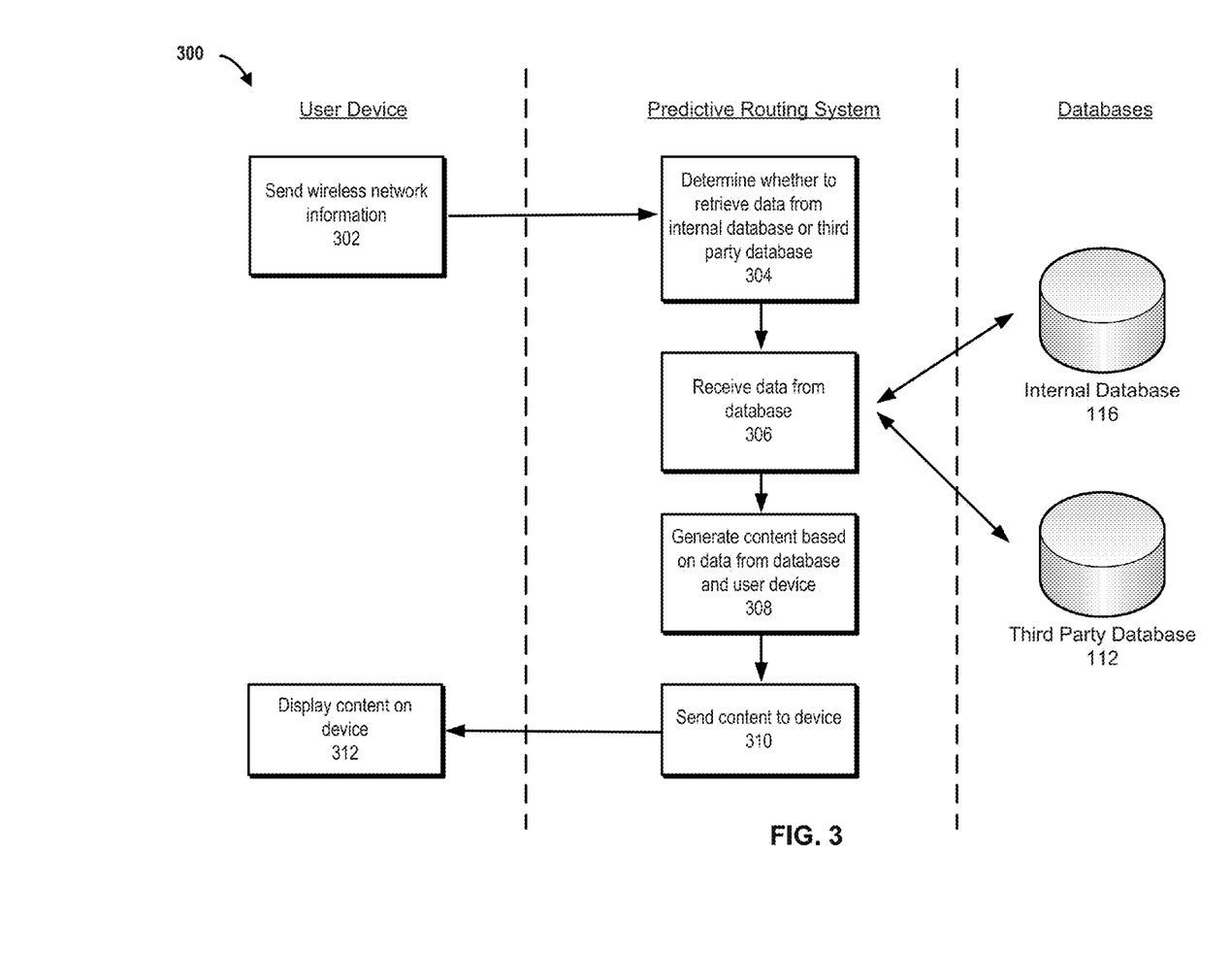
FIG. 3 is a flow diagram of an exemplary process for predictive routing.

FIG. 3 is a flow diagram of an exemplary process 300 for predictive routing. Process 300 can be implemented by the system 100 shown in FIG. 1.

The mobile device 102 sends wireless network information to the predictive-routing system (302). The wireless network information can include a unique identifier (e.g., a Base Station Identification Code ("BSID")) that uniquely identifies the wireless network. Other types of identifiers are also possible, such as a media access control (MAC) address. The mobile device 102 can obtain wireless network information by scanning for or connecting to wireless networks around the mobile device 102.

In some implementations, the mobile device 102 also sends sensor data to the predictive-routing system. The sensor data can include data (position, velocity) from a positioning system (e.g., GPS, WiFi, cell-based), an accelerometer, a gyroscope, or other sensors onboard the mobile device 102. In some implementations, the sensor data can include data measured over time (e.g., multiple position and velocity points over time). In some alternative implementations, the sensor data is sent to the predictive-routing system by a third party (e.g., a bus transportation agency).

The mobile device 102 can determine it is travelling along a predetermined route from the wireless network information (e.g., BSID signal level), location data, and accelerometer data. The mobile device 102 can determine this by tracking whether the mobile device 102 travels outside a radius from an initial position. The mobile device 102 can calculate a distance travelled over a period of time from an initial position to a final position. In some implementations, the mobile device 102 calculates the distance travelled by analyzing location data (e.g., GPS or cell tower data). For example, the mobile device 102 can calculate distance by analyzing location data over a period of time. In some other implementations, the mobile device 102 calculates the radius travelled by analyzing accelerometer data (e.g., direction and speed). For example, by knowing a speed and direction of a mobile device 102 over a period of time, the mobile device 102 can calculate a distance travelled over a period of time. If the mobile device 102 has travelled a distance beyond a radius (e.g., the radius of a general enterprise WiFi network range) around an initial position while maintaining a consistent BSID signal level over the period of time, the mobile device 102 can infer it is traveling along a predetermined route. The mobile device 102 can send the determination of whether the mobile device is traveling along a predetermined route to the predictive routing system 114.

In some implementations, the predictive routing system 114, and not the mobile device 102, can use the sensor data and the wireless network information sent from the mobile device 102 to predict whether the mobile device 102 is travelling along a predetermined route (e.g., using the implementations mentioned above).

When the predictive routing system 114 receives the information from the mobile device 102, the predictive routing system 114 determines whether to retrieve data including a predetermined route from the internal database 112 or the third party database 116 (304) (e.g., a transportation agency's database). The predictive routing system 114 can make this determination based on the type of information received from the mobile device 102. For example, if the mobile device 102 sends the data in the form of a request specified by a third party, the predictive routing system 114 can retrieve data (306) from the third party database 112. Likewise, if the mobile device 102 sends the data in the form of a request specified by the predictive routing system 114, the predictive routing system 114 can retrieve data (306) from the internal database 116. In some implementations, the predictive routing system 114 retrieves data based on a unique identifier sent by the mobile device 102.

The system can optionally confirm that the mobile device 102 is travelling on the predetermined route based on sensor data sent by the mobile device 102. For example, the system 100 can be applied to a mobile device 102 travelling on a bus. Because a bus route and bus stop times are predetermined, the system can calculate approximately, where a bus travelling on the bus route should be at a certain time. The system 100 can compare the mobile device's location and time to the calculated time and location. If the mobile device's location and time match the calculated location and time within a margin of error (e.g., 5% or 10%), the system can confirm the mobile device is travelling on the predetermined route of the bus. In some implementations, the sensor data includes multiple locations (e.g., position fixes from GPS or WiFi positioning systems) and times provided by the mobile device 102. The system 100 can perform the same analysis at each location and time. If each analysis yields the mobile device's location and time exists within the margin of error, the system 100 can increase the accuracy of the confirmation.

The system 100 can also analyze the mobile device's accelerometer data. If the accelerometer data, in addition to a location and time, indicates the mobile device 102 is travelling in the direction of the bus route, the system 100 can confirm with higher accuracy that the mobile device 102 is travelling on the predetermined route. In some implementations, the sensor data can include multiple measurements of accelerometer data tracked over time and location. The system 100 can perform the same analysis with each measurement of accelerometer data at each location and time to increase accuracy of the confirmation.

After retrieving the data from a database (either the internal database 116 or the third party database 112), the predictive routing system 114 can generate content based on the data from the database, 112, 114 and the data from the mobile device 102 (308). The data from the database 112, 114 can include a predetermined route, a unique base station identifier (e.g., BSID), a service provider, a vehicle entity, or other data relevant to the vehicle. The data from the mobile device 102 can include sensor data and wireless data as discussed in step 302. In some implementations, the mobile device 102 can send personal profile information to the predictive routing system 114 that includes content preferences. However, the user would be provided an option through a user interface of the mobile device 102 to opt out of having profile information sent to the predictive routing system 114. The system 100 can generate content by retrieving different types of content from different sources based on the data received from the mobile device 102 or the database 112, 114. For example, the system 100 can retrieve an advertisement from an advertising service. The advertisement can be relevant to the location received from the mobile device 102, such as a local event or a local deal. In some implementations, the system 100 can retrieve content from an Application Program Interface ("API") that returns information specific to a subject of the API. For example, the system can retrieve content about nearby restaurants from a Local API. Based on the predetermined route received from the database, the system 100 can retrieve content related to route information from a service provider such as departure times and locations, transfer points, and transport fees. The system 100 can also retrieve content based on personal preferences received from the mobile device, such as favorite routes, most frequently travelled routes, or advertisement preferences. An example of displaying generated content is described further below in reference to FIG. 5.

After generating content from multiple sources, the predictive routing system 114 can send the generated content to the mobile device 102 (310). Upon receiving the content, the mobile device 102 can display, play or otherwise present the content to the user (312).

Figure 4:
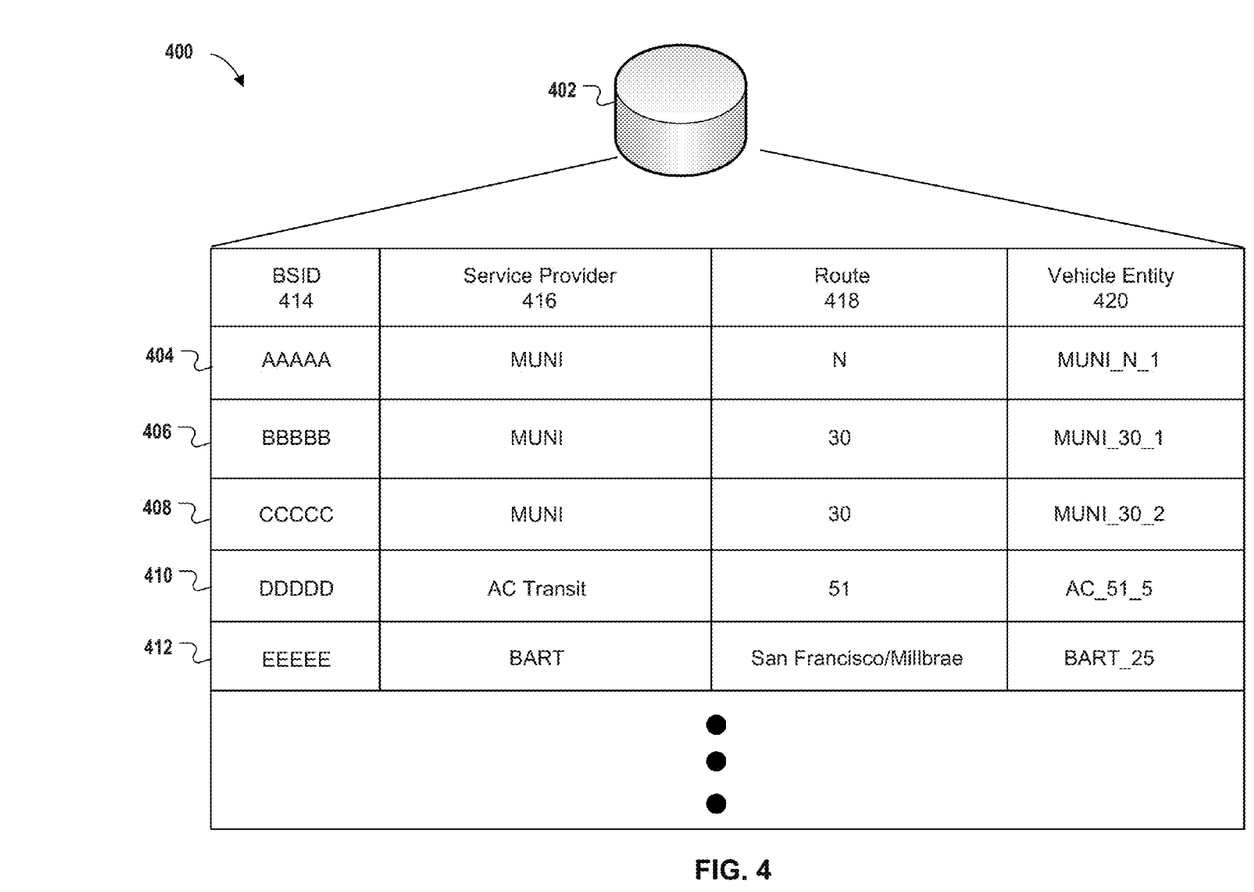
FIG. 4 illustrates an exemplary table in a database that stores route information based on an identification code.

FIG. 4 illustrates an exemplary table 400 in a database that stores route information based on BSID. For simplicity, this table is applied to buses and trains. In some implementations, the table 400 can include information about planes, boats, or other modes of transport. The database 402 can be an internal database 116 or a third party database 112. The entries in the table can include a BSID 414 or other unique identifier, a service provider identifier or name 416, a route identifier or name 418, and a vehicle entity 420. The BSID 414 can be a unique string identifying the wireless network that is installed in the vehicle and also a unique key for the table. The service provider 416 can be the name of the transportation agency responsible for the route information. The route 418 can be the predetermined path a vehicle is supposed to travel. The vehicle entity 420 can be a unique string identifying a vehicle.

Referring to the table of FIG. 4, rows 404-412 illustrate sample entries for various vehicles equipped with a wireless network. Each BSID 414 is unique, for example, none of the BSID's in rows 404-412 are the same. Each service provider 416 can have multiple entries in the table, such as "MUNI" shown in rows 404-408. Some routes can recur, such as routes 30 in rows 406 and 408, because multiple vehicles can travel along that route at different times. Each vehicle entity 420 is unique, for example, none of the vehicle entities in rows 404-412 recurs.

Entries in the database can be added through crowd sourcing techniques. In some implementations, a user application running on the mobile device can be used to add entries into the database 112, 116. Because many different users can use the application to add entries, the application can use crowdsourcing techniques to add entries into the database. The application can be operated by users while travelling on the vehicles. A user can enter in the transportation agency and route information into the application. The application can send the information to the predictive routing system 114 through a wireless network or a cellular data connection. The predictive routing system 114 can obtain a vehicle entity from a transportation agency based on the time, location, route, and transportation agency information that is sent by the mobile device 102. The system 114 then can add an entry containing the wireless network, transportation agency, route information, and vehicle entity into the database, 112, 116.

Figure 5:
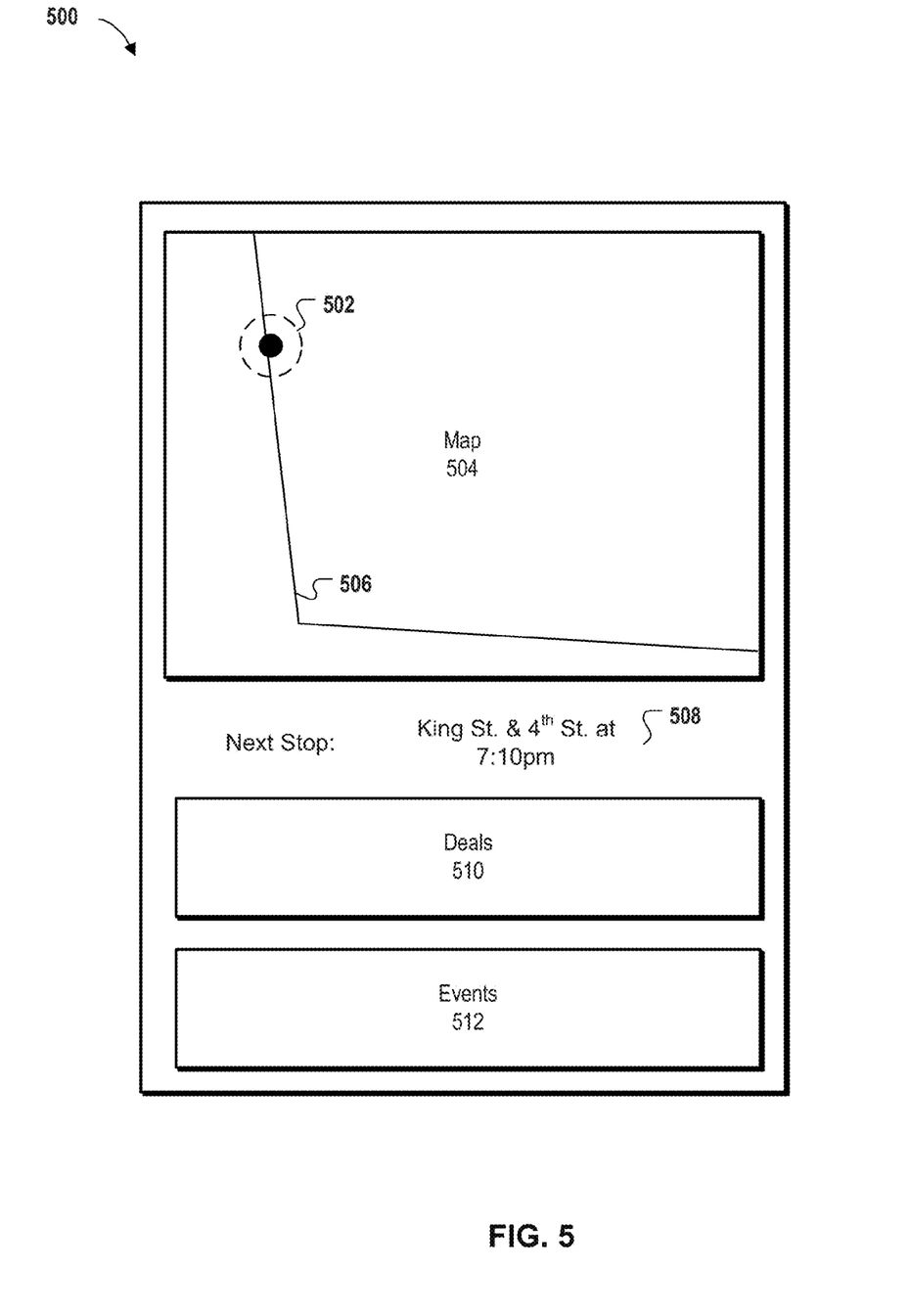
FIG. 5 is an exemplary view of generated content received by a mobile device.

FIG. 5 is an exemplary view 500 of generated content received by a mobile device. In some implementations, an application displays the view 500. In some alternative implementations, the view 500 is displayed as a notification center. The mobile device 102 can receive generated content from the predictive routing system 114. In this example, the generated content can include route information 506, information about the next destination 508, local deals 510, and local events 512. The predictive routing system 114 can generate this content by retrieving information from transportation agencies, a Deals API, and an Events API. The mobile device 102 can display a map 504 including relevant transportation information with the mobile device's current location 502. The mobile device 102 can also display a section for the local deals 510 and a section for local events 512.

Figure 6:
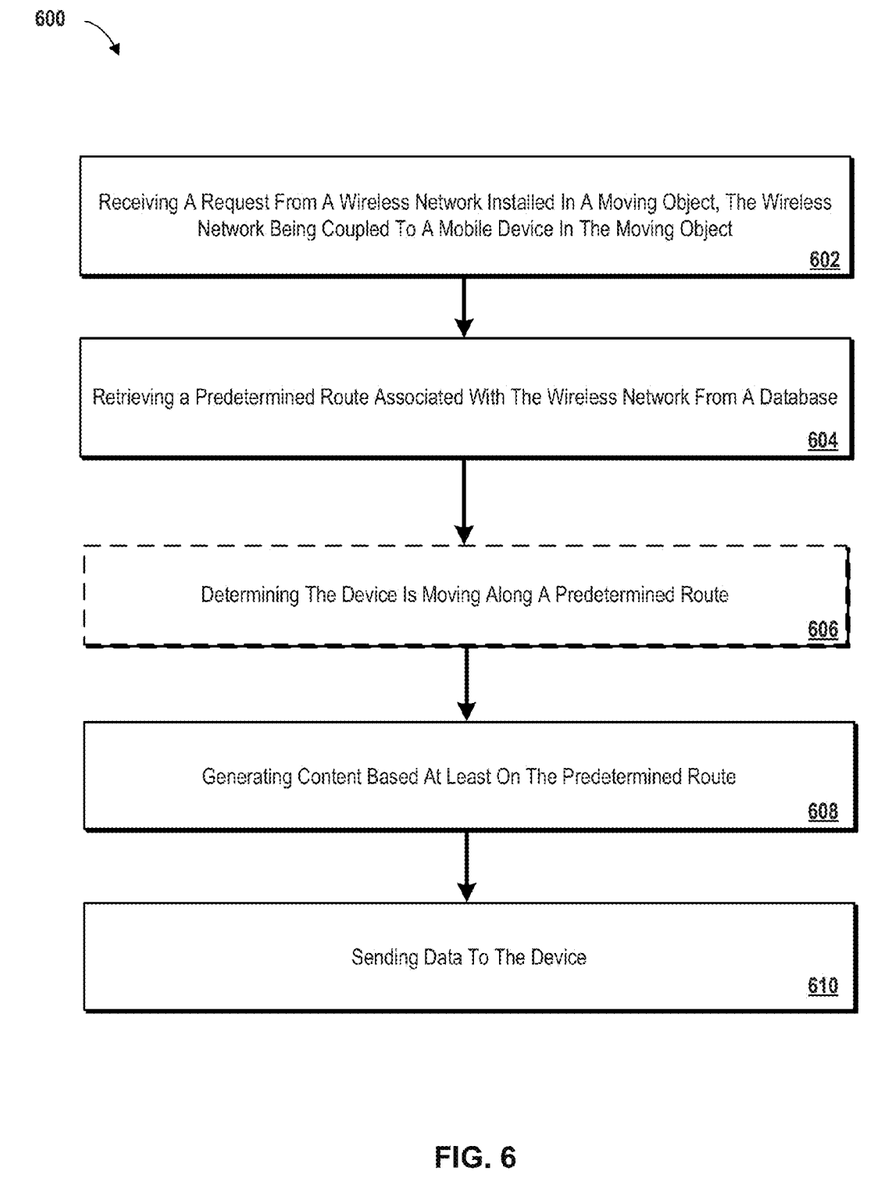
FIG. 6 illustrates a flow diagram of an exemplary process for predicting routes through a wireless network.

FIG. 6 illustrates a flow diagram of an exemplary process 400 for predicting routes through a wireless network. The process 600 can be implemented by the system 100 of FIG. 1.

In some implementations, the process 600 can begin by receiving a request from a wireless network installed in a moving object, the wireless network being coupled to a mobile device in the moving object 602 (e.g., a bus or train). The process 600 can continue with retrieving a predetermined route associated with the wireless network from a database 604. The process 600 can optionally continue by determining the mobile device is moving along a predetermined route 606. In some implementations, the process 600 predicts a predetermined route solely from the wireless network installed in the moving object. Finally, the process finishes with generating or providing content based at least on the predetermined route and sending the content to the device 610. In some implementations, the content includes data to be displayed in an application or as a notification. In some alternative implementations, the content can include an address (e.g., Web or IP address) which, using a browser on the mobile device 102, takes the user to another network location (e.g., web site) to access and download content onto the mobile device 102.

Exemplary Operating Environment

Figure 7:
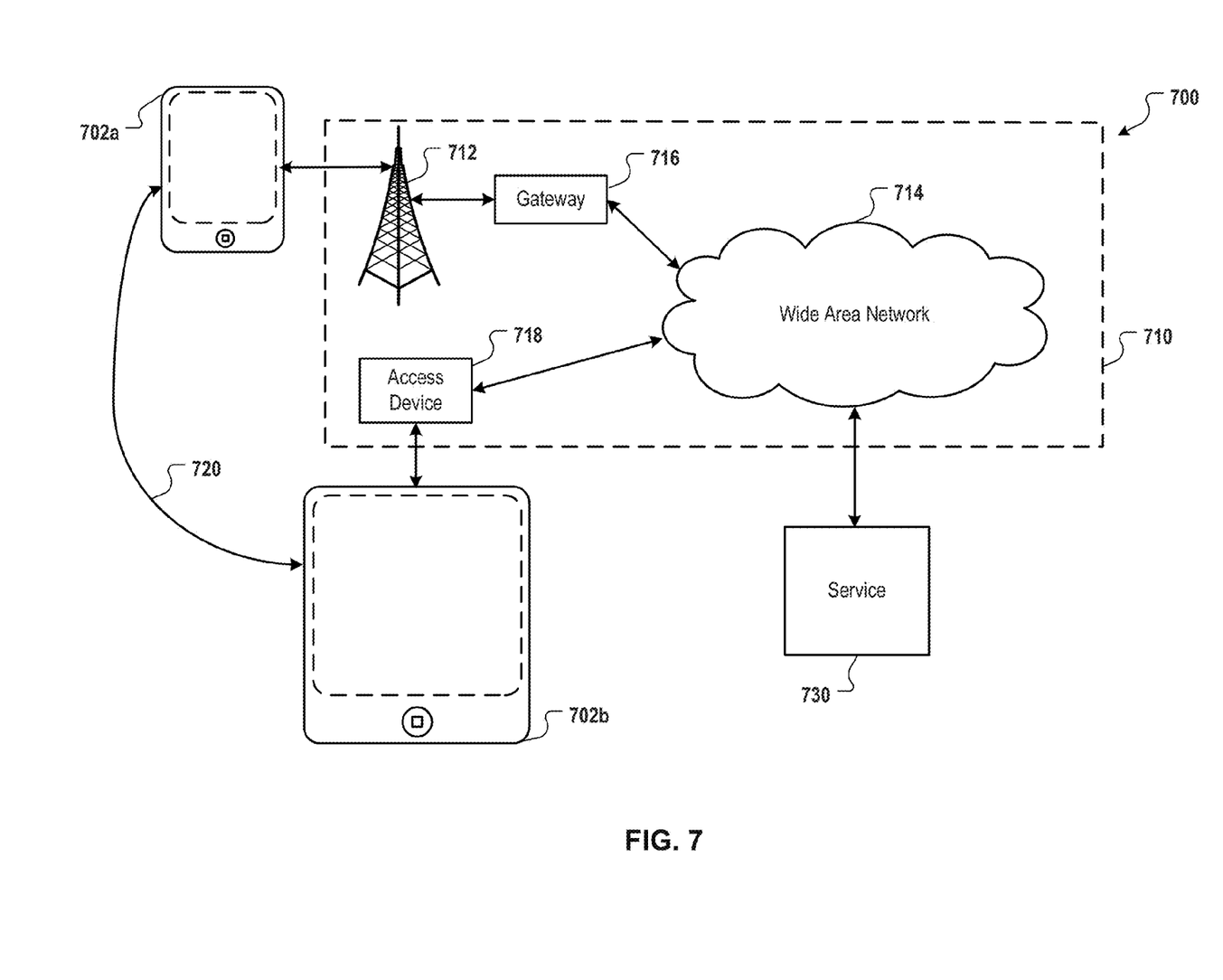
FIG. 7 is a block diagram of an exemplary operating environment capable of predicting routes using wireless networks.

FIG. 7 is a block diagram of an exemplary operating environment for a device capable of connecting to a predictive routing system. In some implementations, devices 702a and 702b can communicate over one or more wired or wireless networks 710. For example, wireless network 712 (e.g., a cellular network) can communicate with a wide area network (WAN) 714 (e.g., the Internet) by use of gateway 716. Likewise, access device 718 (e.g., IEEE 802.11g wireless access device) can provide communication access to WAN 714. Devices 702a, 702b can be any device capable of displaying GUIs of the disclosed content authoring application, including but not limited to portable computers, smart phones and electronic tablets. In some implementations, the devices 702a, 702b do not have to be portable but can be a desktop computer, television system, kiosk system or the like.

In some implementations, both voice and data communications can be established over wireless network 712 and access device 718. For example, device 702a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 712, gateway 716, and WAN 714 (e.g., using Transmission Control Protocol/Internet Protocol (TCP/IP) or User Datagram Protocol (UDP)). Likewise, in some implementations, device 702b can place and receive phone calls, send and receive e-mail messages, and retrieve electronic documents over access device 718 and WAN 714. In some implementations, device 702a or 702b can be physically connected to access device 718 using one or more cables and access device 718 can be a personal computer. In this configuration, device 702a or 702b can be referred to as a "tethered" device.

Devices 702a and 702b can also establish communications by other means. For example, wireless device 702a can communicate with other wireless devices (e.g., other devices 702a or 702b, cell phones) over the wireless network 712. Likewise, devices 702a and 702b can establish peer-to-peer communications 720 (e.g., a personal area network) by use of one or more communication subsystems, such as the Bluetooth™ communication devices. Other communication protocols and topologies can also be implemented.

Devices 702a or 702b can communicate with service 730 over the one or more wired and/or wireless networks 710. For example, service 730 can be an online service that provides predictive routes and/or content based on the predictive routes to mobile devices, including the features described in reference to FIGS. 1-6.

Device 702a or 702b can also access other data and content over one or more wired and/or wireless networks 710. For example, content publishers, such as news sites, Really Simple Syndication (RSS) feeds, Web sites and developer networks can be accessed by device 702a or 702b. Such access can be provided by invocation of a web browsing function or application (e.g., a browser) running on the device 702a or 702b.

Devices 702a and 702b can exchange files over one or more wireless or wired networks 710 either directly or through service 730.

Exemplary Device Architecture

Figure 8:
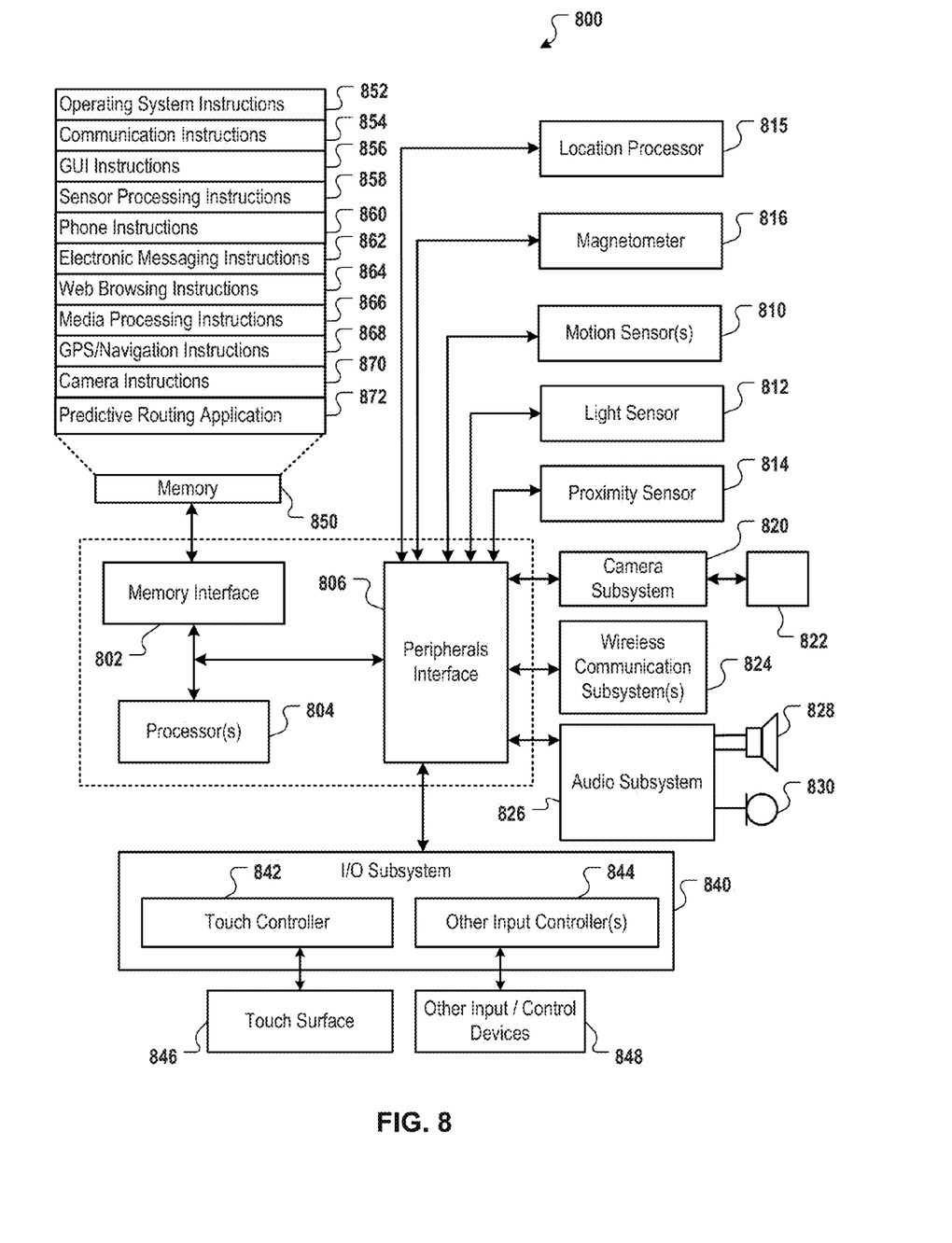
FIG. 8 is a block diagram of an exemplary architecture of a mobile device capable of predicting routes using wireless networks.

FIG. 8 illustrates a block diagram of an exemplary architecture of a mobile device capable of connecting to a predictive routing system. Architecture 800 can be implemented in any device for generating the features described in reference to FIGS. 1-7 including but not limited to portable or desktop computers, smart phones and electronic tablets, television systems, game consoles, kiosks and the like. Architecture 800 can include memory interface 802, data processor(s), image processor(s) or central processing unit(s) 804, and peripherals interface 806. Memory interface 802, processor(s) 804 or peripherals interface 806 can be separate components or can be integrated in one or more integrated circuits. The various components can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the device. For example, in some implementations, light sensor 812 can be utilized to facilitate adjusting the brightness of touch surface 846. In some implementations, motion sensor 810 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 806, such as a temperature sensor, a biometric sensor, or other sensing device, to facilitate related functionalities.

Location processor 815 (e.g., GPS receiver) can be connected to peripherals interface 806 to provide geo-positioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 824. Communication subsystem(s) 824 can include one or more wireless communication subsystems. Wireless communication subsystems 824 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 824 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 824 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 826 can be coupled to a speaker 828 and one or more microphones 830 to facilitate voice-enabled functions, such as voice recognition, voice replication, digital recording, and telephony functions.

I/O subsystem 840 can include touch controller 842 and/or other input controller(s) 844. Touch controller 842 can be coupled to a touch surface 846. Touch surface 846 and touch controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 can display virtual or soft buttons and a virtual keyboard, which can be used as an input/output device by the user.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, device 800 can present recorded audio and/or video files, such as MP3, AAC, and MPEG files. In some implementations, device 800 can include the functionality of an MP3 player and may include a pin connector for tethering to other devices. Other input/output and control devices can be used.

Memory interface 802 can be coupled to memory 850. Memory 850 can include high-speed random access memory or non-volatile memory, such as one or more magnetic disk storage devices, one or more optical storage devices, or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers or servers. Communication instructions 854 can also be used to select an operational mode or communication medium for use by the device, based on a geographic location (obtained by the GPS/Navigation instructions 868) of the device. Memory 850 may include graphical user interface instructions 856 to facilitate graphic user interface processing, such as generating the GUIs shown in FIG. 5; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions and display GUIs described in reference to FIG. 5; media processing instructions 866 to facilitate media processing-related processes and functions; GPS/Navigation instructions 868 to facilitate GPS and navigation-related processes; camera instructions 870 to facilitate camera-related processes and functions; and instructions 872 for a predictive routing application that is capable of displaying GUIs, as described in reference to FIG. 5. The memory 850 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, as part of a request made by a mobile device, data identifying a wireless network that is i) associated with a moving object in which the mobile device is located and ii) in communication with the mobile device;
   transmitting, to a database, the data identifying the wireless network;
   receiving a predetermined route from the database, wherein the database stores an association between the predetermined route and the data identifying the wireless network,
   wherein the predetermined route is an established path to be travelled by the moving object;
   determining that the mobile device is moving along the predetermined route based on the data, including
   calculating a first location and a first direction of the moving object based on the predetermined route and a time received from the mobile device;
   determining a second location and a second direction of the mobile device based on sensor data and the time received from the mobile device; and
   establishing the mobile device is moving along a same path as the moving object based on at least one of the first location and the second location or the first direction and the second direction;
   generating content based at least on the predetermined route; and
   sending the content to the mobile device.

2. The method of claim 1, wherein the moving object is a bus, train, or plane.

3. The method of claim 1, wherein the content is generated from one or more of the following sources: a transportation agency, a local application program interface, or an advertising network.

4. The method of claim 1, wherein the content includes information about a future destination along the predetermined route.

5. The method of claim 1, wherein determining that the mobile device is moving along the predetermined route comprises:
   determining a strength of the wireless network at the first location of the mobile device; and
   determining the strength of the wireless network maintains a consistent level at the second location of the mobile device, the second location located outside a radius of the first location.

6. The method of claim 5, wherein the radius is a range of a general wireless network.

7. The method of claim 5, wherein the locations are determined by location data or data associated with one or more sensors onboard the mobile device.

8. The method of claim 1, wherein the request includes data associated with one or more sensors onboard the mobile device.

9. The method of claim 8, wherein the data includes at least one of accelerometer data and location coordinates.

10. The method of claim 1, wherein the database includes an entry identifying a wireless network, a service provider, a route, and a vehicle entity.

11. The method of claim 1, wherein the database is an internal database or a third party database.

12. The method of claim 1, wherein the request comprises data identifying the wireless network installed in the moving object.

13. The method of claim 12, wherein the data identifying the wireless network comprises an identification code associated with the wireless network.

14. The method of claim 12, wherein the data identifying the wireless network is generated by the mobile device based on a communication received by the mobile device from the wireless network.

15. The method of claim 12 comprising communicating the data identifying the wireless network to the database, and, in response, receiving data identifying the predetermined route.

16. The method of claim 1, wherein the wireless network is associated with the mobile device by communicating an identification of the wireless network to the mobile device.

17. The method of claim 1, wherein the database comprises an entry that includes data identifying the wireless network and data identifying the predetermined route.

18. The method of claim 1, wherein the data identifying the wireless network comprises a Base Station Identification Code (BSID).

19. The method of claim 1, wherein the data identifying the wireless network comprises a media access control (MAC) address.

20. The method of claim 1, comprising determining whether to transmit the data identifying the wireless network to an internal database or a third party database, wherein the determination is based on a type of information specified in the request received from the mobile device.

21. The method of claim 1, comprising transmitting the data identifying the wireless network to an internal database storing an identification of a service provider, and transmitting the data identifying the wireless network to a third party database storing the predetermined route.

22. A system comprising:
   one or more processors;
   memory coupled to the one or more processors and configured to store instructions, which, when executed by the one or more processors, causes the processors to perform operations comprising:
   receiving, as part of a request made by a mobile device, data identifying a wireless network that is i) associated with a moving object in which the mobile device is located and ii) in communication with the mobile device;

transmitting, to a database, the data identifying the wireless network;

receiving a predetermined route from the database, wherein the database stores an association between the predetermined route and the data identifying the wireless network, wherein the predetermined route is an established path to be travelled by the moving object;

determining that the mobile device is moving along the predetermined route based on the data, including calculating a first location and a first direction of the moving object based on the predetermined route and a time received from the mobile device;

determining a second location and a second direction of the mobile device based on sensor data and the time received from the mobile device; and establishing the mobile device is moving along a same path as the moving object based on at least one of the first location and the second location or the first direction and the second direction;

generating content based at least on the predetermined route; and sending the content to the mobile device.

23. The system of claim 22, wherein the moving object is a bus, train, or plane.

24. The system of claim 22, wherein the content is generated from one or more of the following sources: a transportation agency, a local application program interface, or an advertising network.

25. The system of claim 22, wherein the content includes information about a future destination along the predetermined route.

26. The system of claim 22, wherein determining that the mobile device is moving along the predetermined route comprises:

determining a strength of the wireless network at the first location of the mobile device; and determining the strength of the wireless network maintains a consistent level at the second location of the mobile device, the second location located outside a radius of the first location.

27. The system of claim 26, wherein the radius is a range of a general wireless network.

28. The system of claim 26, wherein the locations are determined by location data or data associated with one or more sensors onboard the mobile device.

29. The system of claim 22, wherein the request includes data associated with one or more sensors onboard the mobile device.

30. The system of claim 29, wherein the data includes at least one of accelerometer data and location coordinates.

31. The system of claim 22, wherein the database includes an entry identifying a wireless network, a service provider, a route, and a vehicle entity.

32. The system of claim 22, wherein the database is an internal database or a third party database.

33. The system of claim 22, wherein the request comprises the data identifying the wireless network installed in the moving object.

34. The system of claim 33, wherein the data identifying the wireless network comprises an identification code associated with the wireless network.

35. The system of claim 33, wherein the data identifying the wireless network is generated by the mobile device based on a communication received by the mobile device from the wireless network.

36. The system of claim 33, the operations comprising communicating the data identifying the wireless network to the database, and, in response, receiving data identifying the predetermined route.

37. The system of claim 22, wherein the wireless network is associated with the mobile device by communicating an identification of the wireless network to the mobile device.

38. The system of claim 22, wherein the database comprises an entry that includes the data identifying the wireless network and the data identifying predetermined route.

39. The system of claim 22, wherein the data identifying the wireless network comprises a Base Station Identification Code (BSID).

40. The system of claim 22, wherein the data identifying the wireless network comprises a media access control (MAC) address.

41. The system of claim 22, the operations comprising determining whether to transmit the data identifying the wireless network to an internal database or a third party database, wherein the determination is based on a type of information specified in the request received from the mobile device.

42. The system of claim 22, the operations comprising transmitting the data identifying the wireless network to an internal database storing an identification of a service provider, and transmitting the data identifying the wireless network to a third party database storing the predetermined route.

43. A computer-readable storage device having instructions stored thereon, which, when executed by a processor, cause the processor to perform operations comprising:

receiving, as part of a request made by a mobile device, data identifying a wireless network that is i) associated with a moving object in which the mobile device is located and ii) in communication with the mobile device;

transmitting, to a database, the data identifying the wireless network;

receiving a predetermined route from the database, wherein the database stores an association between the predetermined route and the data identifying the wireless network, wherein the predetermined route is an established path to be travelled by the moving object;

determining that the mobile device is moving along the predetermined route based on the data, including calculating a first location and a first direction of the moving object based on the predetermined route and a time received from the mobile device;

determining a second location and a second direction of the mobile device based on sensor data and the time received from the mobile device; and establishing the mobile device is moving along a same path as the moving object based on at least one of the first location and the second location or the first direction and the second direction;

generating content based at least on the predetermined route; and sending the content to the mobile device.

44. The computer-readable storage device of claim 43, wherein the moving object is a bus, train, or plane.

45. The computer-readable storage device of claim 43, wherein the content is generated from one or more of the following sources: a transportation agency, a local application program interface, or an advertising network.

46. The computer-readable storage device of claim 43, wherein the content includes information about a future destination along the predetermined route.

47. The computer-readable storage device of claim 43, wherein determining that the mobile device is moving along the predetermined route comprises:
   determining a strength of the wireless network at the first location of the mobile device; and
   determining the strength of the wireless network maintains a consistent level at the second location of the mobile device, the second location located outside a radius of the first location.

48. The computer-readable storage device of claim 47, wherein the radius is a range of a general wireless network.

49. The computer-readable storage device of claim 47, wherein the locations are determined by location data or data associated with one or more sensors onboard the mobile device.

50. The computer-readable storage device of claim 43, wherein the request includes data associated with one or more sensors onboard the mobile device.

51. The computer-readable storage device of claim 50, wherein the data includes at least one of accelerometer data and location coordinates.

52. The computer-readable storage device of claim 43, wherein the database includes an entry identifying a wireless network, a service provider, a route, and a vehicle entity.

53. The computer-readable storage device of claim 43, wherein the database is an internal database or a third party database.

54. The computer-readable storage device of claim 43, wherein the request comprises the data identifying the wireless network installed in the moving object.

55. The computer-readable storage device of claim 54, wherein the data identifying the wireless network comprises an identification code associated with the wireless network.

56. The computer-readable storage device of claim 54, wherein the data identifying the wireless network is generated by the mobile device based on a communication received by the mobile device from the wireless network.

57. The computer-readable storage device of claim 54, the operations comprising communicating the data identifying the wireless network to the database, and, in response, receiving data identifying the predetermined route.

58. The computer-readable storage device of claim 43, wherein the wireless network is associated with the mobile device by communicating an identification of the wireless network to the mobile device.

59. The computer-readable storage device of claim 43, wherein the database comprises an entry that includes data identifying the wireless network and data identifying the predetermined route.

60. The computer-readable storage device of claim 43, wherein the data identifying the wireless network comprises a Base Station Identification Code (BSID).

61. The computer-readable storage device of claim 43, wherein the data identifying the wireless network comprises a media access control (MAC) address.

62. The computer-readable storage device of claim 43, the operations comprising determining whether to transmit the data identifying the wireless network to an internal database or a third party database, wherein the determination is based on a type of information specified in the request received from the mobile device.

63. The computer-readable storage device of claim 43, the operations comprising transmitting the data identifying the wireless network to an internal database storing an identification of a service provider, and transmitting the data identifying the wireless network to a third party database storing the predetermined route.

* * * * *